US012579695B2

(12) United States Patent
Arai

(10) Patent No.: US 12,579,695 B2
(45) Date of Patent: Mar. 17, 2026

(54) METHOD OF GENERATING TARGET IMAGE DATA, ELECTRICAL DEVICE AND NON- TRANSITORY COMPUTER READABLE MEDIUM

(71) Applicant: GUANGDONG OPPO MOBILE TELECOMMUNICATIONS CORP., LTD., Dongguan (CN)

(72) Inventor: Toshihiko Arai, Yokohama (JP)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 466 days.

(21) Appl. No.: 18/092,195

(22) Filed: Dec. 30, 2022

(65) Prior Publication Data

US 2023/0144286 A1     May 11, 2023

Related U.S. Application Data

(63) Continuation of application No. PCT/CN2020/112800, filed on Sep. 1, 2020.

(51) Int. Cl.
G06T 9/00          (2006.01)
(52) U.S. Cl.
CPC ...................................... G06T 9/00 (2013.01)
(58) Field of Classification Search
CPC .......... G06T 9/00; H04N 1/648; H04N 19/90; G06V 30/1819
See application file for complete search history.

(56) References Cited

U.S. PATENT DOCUMENTS

2003/0123722 A1     7/2003  Newman
2012/0070095 A1*    3/2012  Cieslinski ............... G06T 9/004
                                                            382/251
(Continued)

FOREIGN PATENT DOCUMENTS

CN          101986295 A      3/2011
CN          108062523 A      5/2018
(Continued)

OTHER PUBLICATIONS

Japanese Decision to Grant a Patent for Japanese Application No. 2023-514491, mailed Jan. 23, 2024, 3 pages.
(Continued)

*Primary Examiner* — Amandeep Saini
*Assistant Examiner* — Mehrazul Islam
(74) *Attorney, Agent, or Firm* — Young Basile Hanlon & MacFarlane, P.C.

(57) ABSTRACT

A method includes obtaining an embedded sparse image data for generating a target image data from an image signal processor, wherein the embedded sparse image data includes a sparse image data including pixels which include at least first color pixels, second color pixels and third color pixels; extracting a split data including first and second data parts from the sparse image data; joining the first and second data parts to obtain a compressed data; inversely converting the compressed data based on a compression curve to obtain an inversely converted residual data; adding a random value within an error range to the inversely converted residual data to obtain a reconstructed residual data; and reconstructing a dense image data based on the reconstructed residual data and the sparse image data, wherein the dense image data includes pixels including the first color pixels.

20 Claims, 13 Drawing Sheets

(56) References Cited

U.S. PATENT DOCUMENTS

| | | | |
|---|---|---|---|
| 2015/0268580 A1 | 9/2015 | Hirata et al. | |
| 2019/0362132 A1 | 11/2019 | Zhang et al. | |
| 2021/0042881 A1* | 2/2021 | Zavalishin | G06T 3/4015 |
| 2021/0218936 A1* | 7/2021 | Meitav | H04N 19/186 |

FOREIGN PATENT DOCUMENTS

| | | | |
|---|---|---|---|
| CN | 108876788 A | 11/2018 | |
| CN | 110929627 A | 3/2020 | |
| CN | 111292323 A | 6/2020 | |
| JP | H10191353 A | 7/1998 | |
| JP | 2012231378 A | 11/2012 | |
| JP | 2018182622 A | 11/2018 | |

OTHER PUBLICATIONS

Chinese First Office Action with English translation for Chinese Application No. 202080102554.6, mailed Sep. 14, 2024, 10 pages.

Extended European Search Report for EP Application 20951862.0 mailed May 11, 2023. (11 pages).

Anonymous :"Dither—wikipedia", XP055518308, Retrieved from the Internet :URL:https://en.wikipedia.org/w/index.php?title=Dither &oldid=632561827, Nov. 5, 2014. (13 pages).

International Search Report and Written Opinion for PCT Application PCT/CN2020/112800 mailed May 26, 2021. (10 pages).

European Examination Report for EP Application No. 20951862.0, mailed Mar. 17, 2025, 6 pages.

* cited by examiner

METHOD OF GENERATING TARGET IMAGE DATA, ELECTRICAL DEVICE AND NON- TRANSITORY COMPUTER READABLE MEDIUM

CROSS REFERENCE TO RELATED APPLICATIONS

This application is a continuation-application of International (PCT) Patent Application No. PCT/CN2020/112800 filed on Sep. 1, 2020, the contents of which are herein incorporated by reference in their entireties.

TECHNICAL FIELD

The present disclosure relates to a method of generating a target image data, an electrical device implementing such method and a non-transitory computer readable medium including program instructions stored thereon for performing such method.

BACKGROUND

Electrical devices such as smartphones and tablet terminals are widely used in our daily life. Nowadays, many of the electrical devices are equipped with a camera assembly to capture an image. Some of the electrical devices are portable and are thus easy to carry. Therefore, a user of the electrical device can easily take a picture of an object by using the camera assembly of the electrical device anytime, anywhere.

There are many formats to capture the image of the object and generate the target image data thereof. One of the widely known formats is a Bayer format which includes a sparse image data.

In addition to the sparse image data, in order to improve a quality of the image of the object in the target image data, a dense image data is also generated when the camera assembly captures the image of the object. In this case, the sparse image data and the dense image data are used to generate the target image data to be displayed on a display or to be stored in a memory of the electrical device. In order to reduce development costs of the electrical devices, it is preferable to use a common image signal processor to generate the target image data based on the sparse image data and the dense image data.

SUMMARY

The present disclosure needs to provide a method of generating a target image data, an electrical device implementing such method and a non-transitory computer readable medium including program instructions stored thereon for performing such method.

In accordance with the present disclosure, a method of generating a target image data may include:

obtaining an embedded sparse image data for generating the target image data from an image signal processor, wherein the embedded sparse image data includes a sparse image data, and the sparse image data includes a plurality of pixels which include at least pixels in a first color, pixels in a second color and pixels in a third color;

extracting a split data including a first data part and a second data part from the sparse image data;

joining the first data part and the second data part to obtain a compressed data;

inversely converting the compressed data based on a compression curve to obtain an inversely converted residual data;

adding a random value within an error range to the inversely converted residual data to obtain a reconstructed residual data; and reconstructing a dense image data based on the reconstructed residual data and the sparse image data, wherein the dense image data includes a plurality of pixels including the pixels in the first color.

In accordance with the present disclosure, an electrical device may include:

an image signal processor configured to generate a target image data based on an embedded sparse image data; and a main processor configured to:

obtain the embedded sparse image data for generating the target image data from the image signal processor, wherein the embedded sparse image data includes a sparse image data, and the sparse image data includes a plurality of pixels which include at least pixels in a first color, pixels in a second color and pixels in a third color;

extract a split data including a first data part and a second data part from the sparse image data;

join the first data part and the second data part to obtain a compressed data;

inversely convert the compressed data based on a compression curve to obtain an inversely converted residual data;

add a random value within an error range to the inversely converted residual data to obtain a reconstructed residual data; and reconstruct a dense image data based on the reconstructed residual data and the sparse image data, wherein the dense image data includes a plurality of pixels including the pixels in the first color.

In accordance with the present disclosure, a non-transitory computer readable medium may include program instructions stored thereon for performing at least the following:

obtaining an embedded sparse image data for generating the target image data from an image signal processor, wherein the embedded sparse image data includes a sparse image data, and the sparse image data includes a plurality of pixels which include at least first color pixels, second color pixels and third color pixels;

extracting a split data including a first data part and a second data part from the sparse image data;

joining the first data part and the second data part to obtain a compressed data;

inversely converting the compressed data based on a compression curve to obtain an inversely converted residual data;

adding a random value within an error range to the inversely converted residual data to obtain a reconstructed residual data; and reconstructing a dense image data based on the reconstructed residual data and the sparse image data, wherein the dense image data includes a plurality of pixels including the first color pixels.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
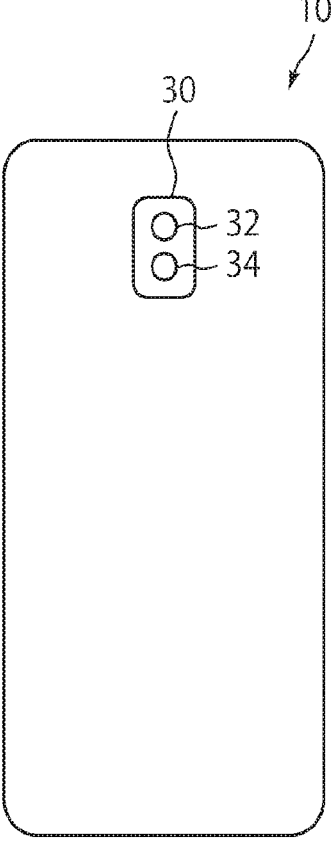
FIG. 1 is a plan view of a first side of an electrical device according to an embodiment of the present disclosure.

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

First Embodiment

Figure 2:
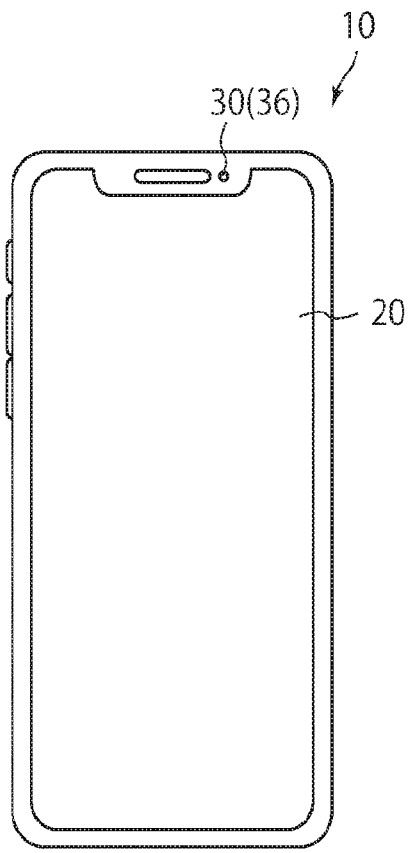
FIG. 2 is a plan view of a second side of the electrical device according to the embodiment of the present disclosure.

FIG. 1 is a plan view of a first side of an electrical device 10 according to a first embodiment of the present disclosure and FIG. 2 is a plan view of a second side of the electrical device 10 according to the first embodiment of the present disclosure. The first side may be referred to as a back side of the electrical device 10 whereas the second side may be referred to as a front side of the electrical device 10.

As shown in FIG. 1 and FIG. 2, the electrical device 10 may include a display 20 and a camera assembly 30. In the present embodiment, the camera assembly 30 includes a first main camera 32, a second main camera 34 and a sub camera 36. The first main camera 32 and the second main camera 34 can capture an image in the first side of the electrical device 10 and the sub camera 36 can capture an image in the second side of the electrical device 10. Therefore, the first main camera 32 and the second main camera 34 are so-called out-cameras whereas the sub camera 36 is a so-called in-camera. As an example, the electrical device 10 can be a mobile phone, a tablet computer, a personal digital assistant, and so on.

Each of the first main camera 32, the second main camera 34 and the sub camera 36 has an image sensor which converts a light which has passed a color filter to an electrical signal. A signal value of the electrical signal depends on an amount of the light which has passed the color filter.

Although the electrical device 10 according to the present embodiment has three cameras, the electrical device 10 may have less than three cameras or more than three cameras. For example, the electrical device 10 may have two, four, five, and so on, cameras.

Figure 3:
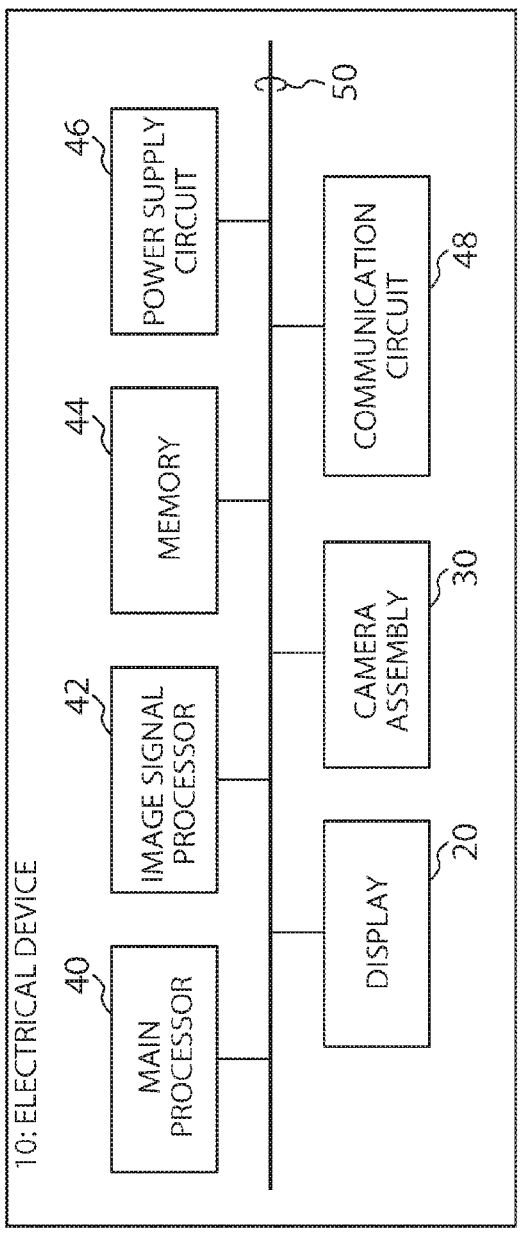
FIG. 3 is a block diagram of the electrical device according to the first embodiment of the present disclosure.

FIG. 3 is a block diagram of the electrical device 10 according to the present embodiment. As shown in FIG. 3, in addition to the display 20 and the camera assembly 30, the electrical device 10 may include a main processor 40, an image signal processor 42, a memory 44, a power supply circuit 46 and a communication circuit 48. The display 20, the camera assembly 30, the main processor 40, the image signal processor 42, the memory 44, the power supply circuit 46 and the communication circuit 48 are connected with each other via a bus 50.

The main processor 40 executes one or more program instructions stored in the memory 44. The main processor 40 implements various applications and data processing of the electrical device 10 by executing the program instructions. The main processor 40 may be one or more computer processors. The main processor 40 is not limited to one CPU core, but it may have a plurality of CPU cores. The main processor 40 may be a main CPU of the electrical device 10, an image processing unit (IPU) or a DSP provided with the camera assembly 30.

The image signal processor 42 controls the camera assembly 30 and processes various kinds of image data captured by the camera assembly 30 to generate a target image data. For example, the image signal processor 42 can apply a demosaicing process, a noise reduction process, an auto exposure process, an auto focus process, an auto white balance process, a high dynamic range process and so on, to the image data captured by the camera assembly 30.

In the present embodiment, the main processor 40 and the image signal processor 42 collaborate with each other to generate a target image data of the object captured by the camera assembly 30. That is, the main processor 40 and the image signal processor 42 are configured to capture the image of the object by means of the camera assembly 30 and apply various kinds of image processing to the captured image data.

The memory 44 stores program instructions to be executed by the main processor 40, and various kinds of data. For example, data of the captured image are also stored in the memory 44.

The memory 44 may include a high-speed RAM memory, and/or a non-volatile memory such as a flash memory and a magnetic disk memory. That is, the memory 44 may include a non-transitory computer readable medium in which the program instructions are stored.

The power supply circuit 46 may have a battery such as a lithium-ion rechargeable battery and a battery management unit (BMU) for managing the battery.

The communication circuit 48 is configured to receive and transmit data to communicate with base stations of the telecommunication network system, the Internet or other devices via wireless communication. The wireless communication may adopt any communication standard or protocol, including but not limited to GSM (Global System for Mobile communication), CDMA (Code Division Multiple Access), LTE (Long Term Evolution), LTE-Advanced, 5th generation (5G). The communication circuit 48 may include an antenna and an RF (radio frequency) circuit.

Figure 4:
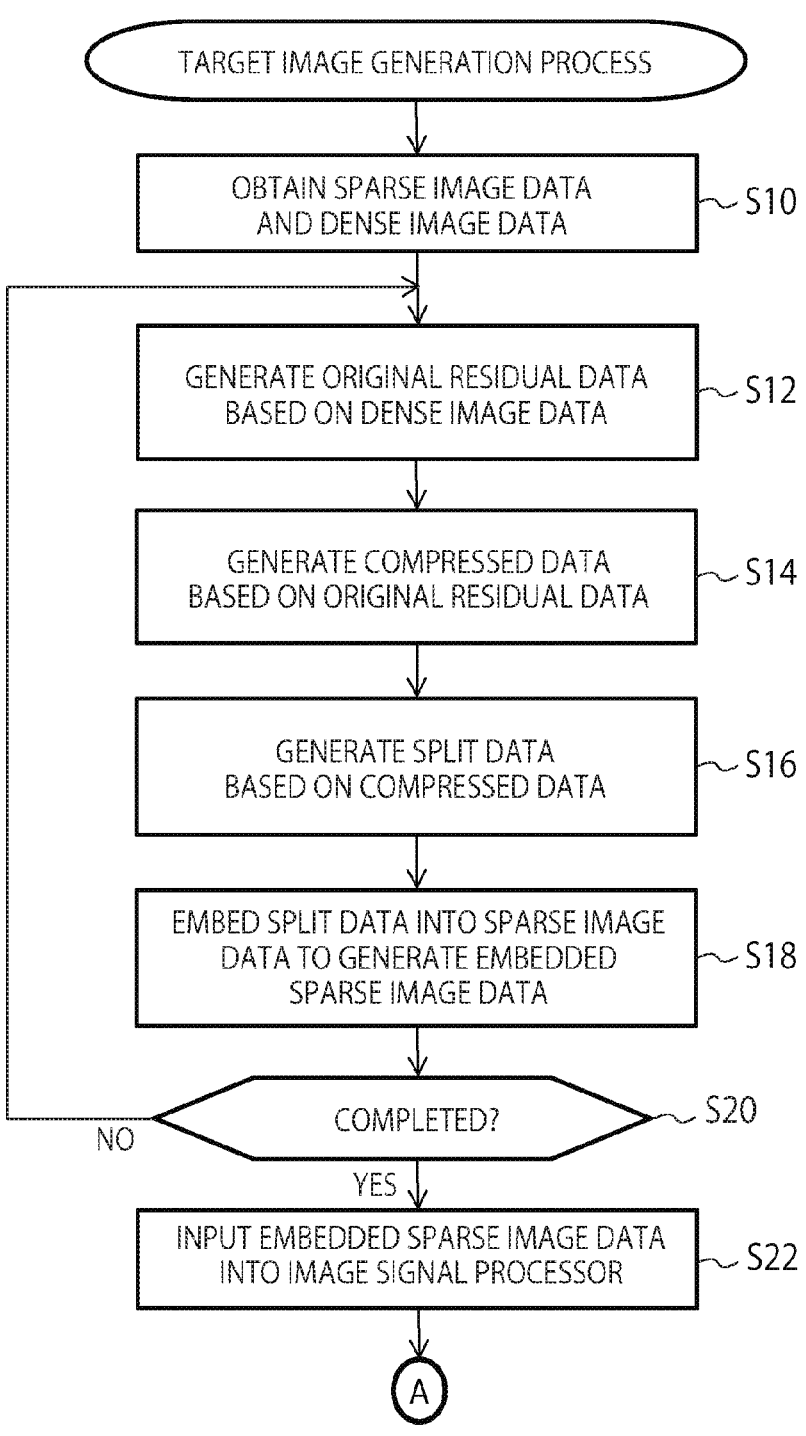
FIG. 4 is a flowchart of a target image generation process performed by the electrical device according to the embodiment of the present disclosure (part 1)
Figure 5:
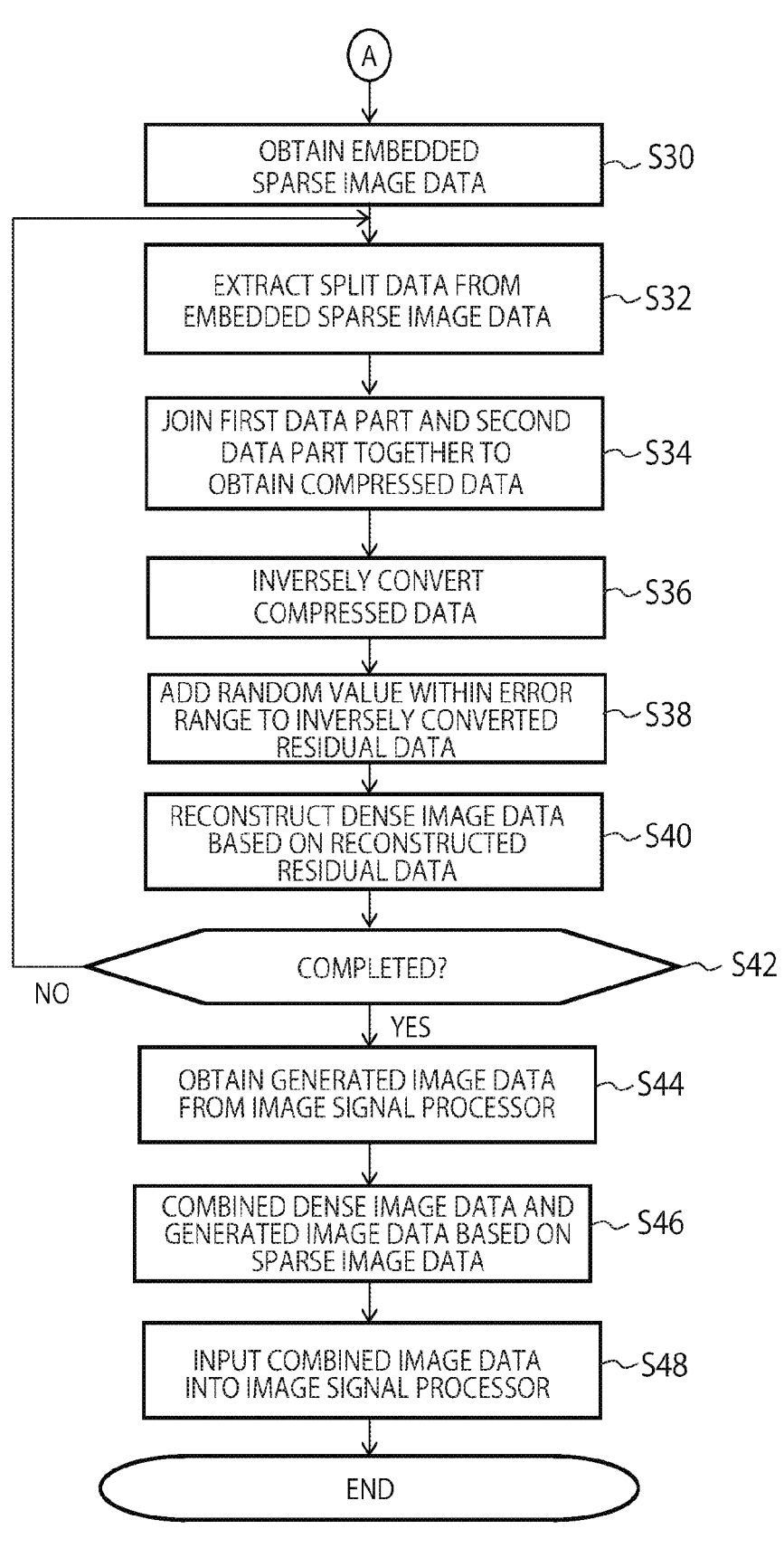
FIG. 5 is a flowchart of the target image generation process performed by the electrical device according to the embodiment of the present disclosure (part 2)

FIG. 4 and FIG. 5 illustrate a flowchart of a target image generation process performed by the electrical device 10 according to the present embodiment. In the present embodiment, the target image generation process is executed by, for example, the main processor 40 in order to generate the target image data. However, the main processor 40 may collaborate with the image signal processor 42 to generate the target image data. Therefore, the main processor 40 and the image signal processor 42 constitute an image processor in the present embodiment.

In addition, in the present embodiment, program instructions of the target image generation process are stored in the non-transitory computer readable medium of the memory 44. Therefore, for example, when the program instructions are read out from the memory 44 and executed in the main processor 40, the main processor 40 implements the target image generation process illustrated in FIG. 4 and FIG. 5.

As shown in FIG. 4, for example, the main processor 40 obtains a sparse image data and a dense image data (Step S10). In the present embodiment, the main processor 40 obtains the sparse image data and the dense image data from the camera assembly 30. That is, the camera assembly 30 captures an image of an object and generates both the sparse image data and the dense image data. In the present embodiment, the sparse image data includes a plurality of green pixels, a plurality of red pixels and a plurality of blue pixels. On the other hand, the dense image data includes a plurality of green pixels.

In order to generate the sparse image data and the dense image data with the camera assembly 30, the camera assembly 30 may have a specialized image sensor to capture the image of the object and generate the sparse image data and the dense image data with a single camera by executing a single imaging operation. In this case, for example, the first main camera 32 may capture the image of the object and generate both the sparse image data and the dense image data by executing the single imaging operation.

On the other hand, the camera assembly 30 may use two cameras to capture the image of the object and generate the sparse image data and the dense image data by executing a single imaging operation. In this case, for example, the first main camera 32 captures the image of the object and generates the sparse image data whereas the second main camera 34 captures the image of the object and generates the dense image data.

On the other hand, the camera assembly 30 may capture the image of the object and generate the sparse image data and the dense image data with a single camera by executing two imaging operations. For example, the sub camera 36 captures the image of the object by executing a first imaging operation to generate the sparse image data and then the sub camera 36 captures the image of the object by executing a second imaging operation immediately after the first imaging operation, to generate the dense image data.

Figure 6:
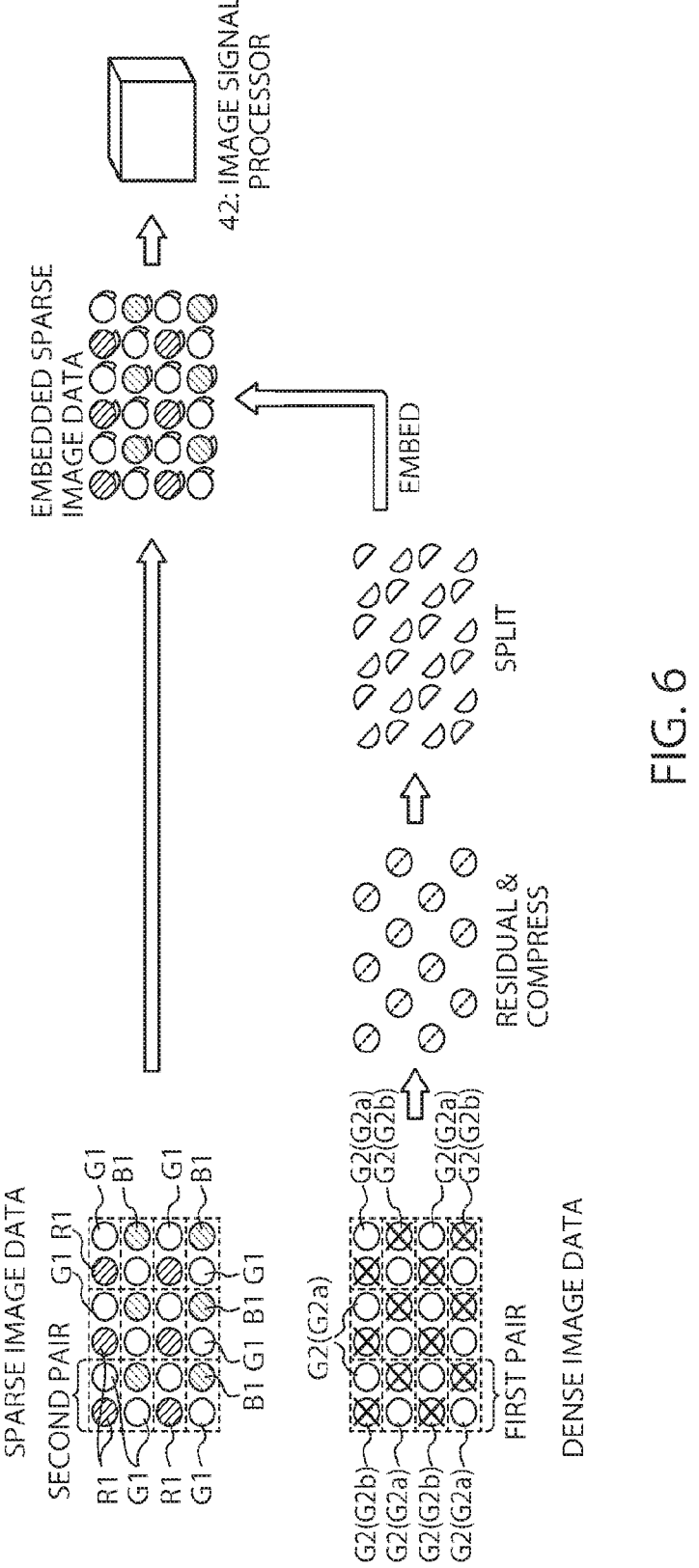
FIG. 6 is a schematic drawing of a mechanism for generating an embedded sparse image data inputted to an image signal processor in the embodiment of the present disclosure.

FIG. 6 illustrates a schematic drawing explaining a mechanism to generate an embedded sparse image data to be inputted to the image signal processor 42.

As shown in FIG. 6, the sparse image data is in conformity to a Bayer format. Therefore, an arrangement of green, red and blue of a color filter of the image sensor of the camera assembly 30 to capture the image of the object is in conformity to a Bayer arrangement. In the Bayer format, the number of the green pixels G1 is double of the number of the red pixels R1 or the number of the blue pixels B1 in the sparse image data. The sparse image data may also be referred to as RAW data from the camera assembly 30.

The dense image data is composed of the green pixels G2. This is because the human eye is more sensitive to a brightness of the green than a brightness of the red or the blue. In the present embodiment, the dense image is captured to adjust the brightness of the target image data.

Next, as shown in FIG. 4, for example, the main processor 40 selects two green pixels G2 in the dense image data and generates an original residual data of the selected two green pixels G2 (Step S12). That is, in the present embodiment, in order to reduce a data amount, the original residual data is generated by calculating a difference value between two adjacent pixels in the dense image data.

Figure 7:
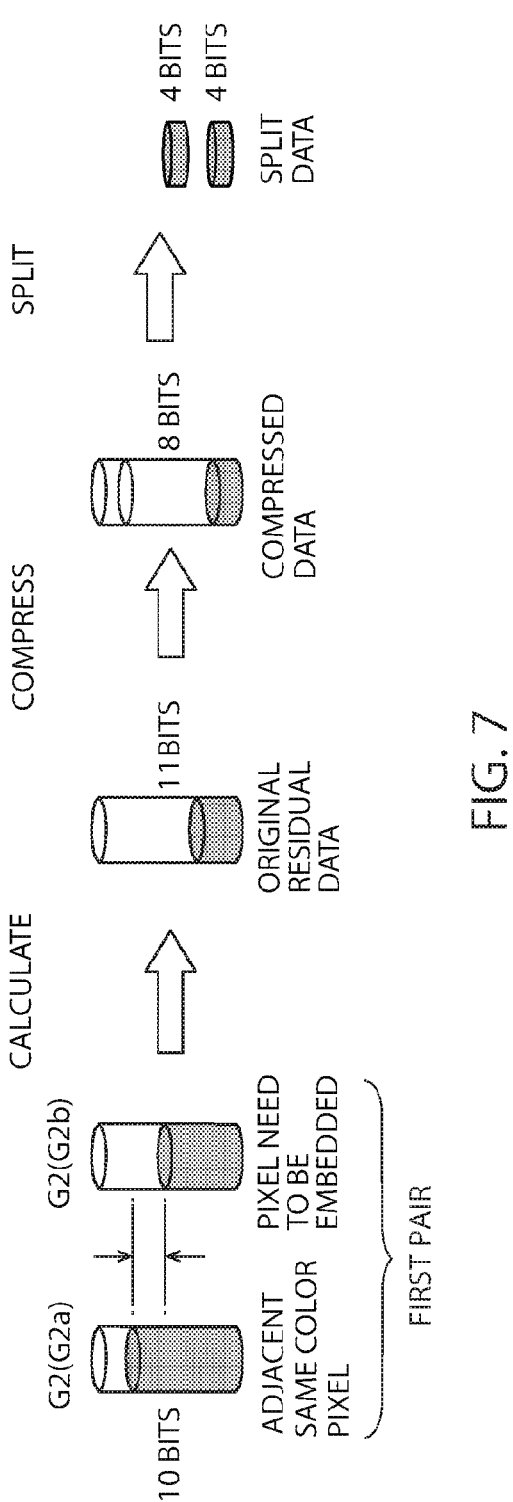
FIG. 7 is a schematic drawing to explain how to calculate an original residual data and a compressed data based on two adjacent pixels in a first pair in the dense image data in the embodiment of the present disclosure.

FIG. 7 illustrates a schematic drawing explaining how to generate the original residual data, a compressed data and a split data. As shown in FIG. 6 and FIG. 7, the green pixels G1 in the sparse image data correspond to the green pixels G2$a$ in the dense image data. That is, the values of the green pixels G1 and the values of the green pixel G2$a$ at the same position are substantially equal to each other.

On the other hand, the green pixels G2$b$ are included in the dense image data but are not included in the sparse image data. That is, the sparse image data does not include the green pixels which correspond to the green pixels G2$b$ in the dense image data. In FIG. 7, one of the green pixels G2$a$ and one of the green pixels G2$b$ adjacent to each other, which constitute a first pair, are depicted as an example. In other words, for example, the main processor 40 selects one of the first pairs in the dense image data in the Step S12, and the Step S12 through the Step S20 mentioned hereinafter are repeated until all of the first pairs have been processed.

In general, the brightness of the two adjacent pixels is approximate to or the same as each other. That is, the difference value between a value of the green pixel G2$a$ and a value of the green pixel G2$b$ adjacent to the green pixel G2$a$ is generally small. Therefore, in the present embodiment, in order to reduce the data amount, the difference value between the value of the green pixel G2$a$ and the value of the green pixel G2$b$ adjacent to the green pixel G2$a$ is obtained by subtracting the value of the green pixel G2$b$ from the value of the green pixel G2$a$ adjacent to the green pixel G2$b$.

In other words, two adjacent pixels G2$a$ and G2$b$ in the dense image data constitute the first pair to generate the original residual data. In the example of the sparse image data in FIG. 6, there are 12 (3×4) first pairs to calculate the original residual data. In other words, the number of the first pairs is half of the number of the green pixels G2 of the dense image data.

Furthermore, for example, in the present embodiment, one green pixel G2 is composed of 10 bits. That is, a value of the one green pixel G2 of the dense image data is between 0 and 1023. Therefore, the original residual data is composed of 11 bits, because a value of the original residual data becomes between +1023 and −1024.

Next, as shown in FIG. 4, for example, the main processor 40 generates a compressed data based on the original residual data (Step S14). There are various ways to compress the original residual data to reduce the number of bits of the original residual data. One example of the ways to compress the original residual data will be explained herein.

Figure 8:
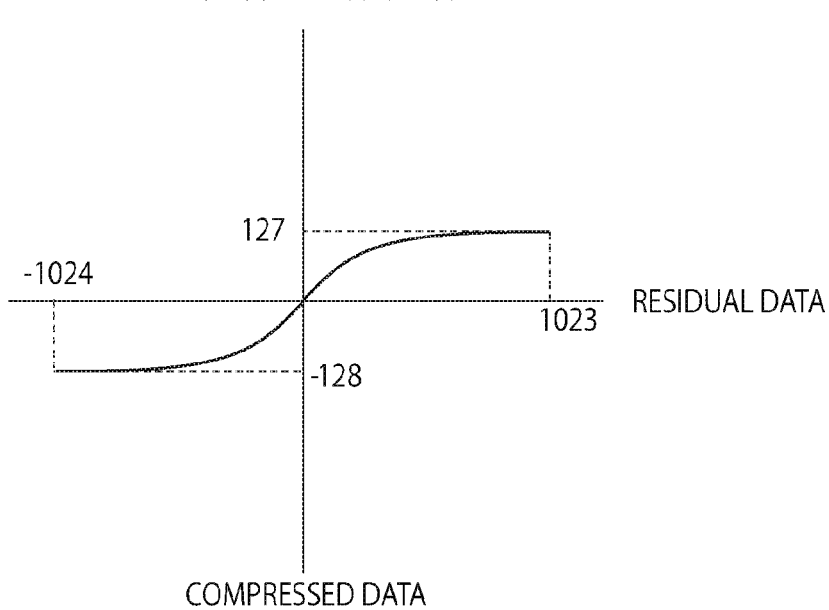
FIG. 8 illustrates one of the examples of a compression curve for compressing the original residual data to generate the compressed data in the embodiment of the present disclosure.

FIG. 8 shows one of the examples of a compression curve to compress the original residual data to generate the compressed data. That is, the original residual data is converted to the compressed data based on the compression curve. The compression curve is also referred to as a tone curve to compress various data and defines a relationship between a value of the original residual data and a value of the compressed data. The number of bits of the compressed data is smaller than the number of bits of the original residual data.

For example, as shown in FIG. 7 and FIG. 8, in the present embodiment, the original residual data composed of 11 bits is compressed to the compressed data composed of 8 bits. That is, the value of the original residual data is between −1024 and +1023 whereas the value of the compressed data is between −128 and +127.

As mentioned above, since the difference value between the values of the two adjacent green pixels G2*a* and G2*b* of the dense image data is generally small, the compression curve is substantially linearly increasing and decreasing in a range in which an absolute value of the original residual data is small. On the other hand, the compression curve is substantially flat or constant in a range in which the absolute value of the original residual data is large. As a result, the compression curve is S-shaped.

By compressing the original residual data based on the compression curve shown in FIG. 8, the original residual data composed of 11 bits can be compressed to the compressed data composed of 8 bits. For example, if the value of the original residual data is 10, the value of the compressed data is also 10. Therefore, if the value of the original residual data is expanded based on the compression curve, the value of the residual data can be returned to 10. That is, in the range in which the absolute value of the original residual data is small, the compressed data can be returned to substantially the same residual data as the original one.

On the other hand, if the value of the original residual data is 1023, the value of the compressed data is 127. In addition, if the value of the original residual data is 980, the value of the compressed data is 126. That is, in the range in which the absolute value of the original residual data is large, the compressed data cannot be returned to the same residual data as the original one. In other words, when the absolute value of the original residual data is large, the expanded value of the residual data based on the compressed data is rough. However, since the possibility that the absolute value of the original residual data is large is lower than the possibility that the absolute value of the original residual data is small, a low reproducibility of the value range in which the absolute value of the original residual data is large, is acceptable.

Next, as shown in FIG. 4, for example, the main processor 40 generates a split data based on the compressed data (Step S16). That is, since a size of the pixel of the compressed data is too large to embed it into the sparse image data, in the present embodiment, the compressed data is split into two pieces of data, i.e., a first data part and a second data part.

Figure 9:
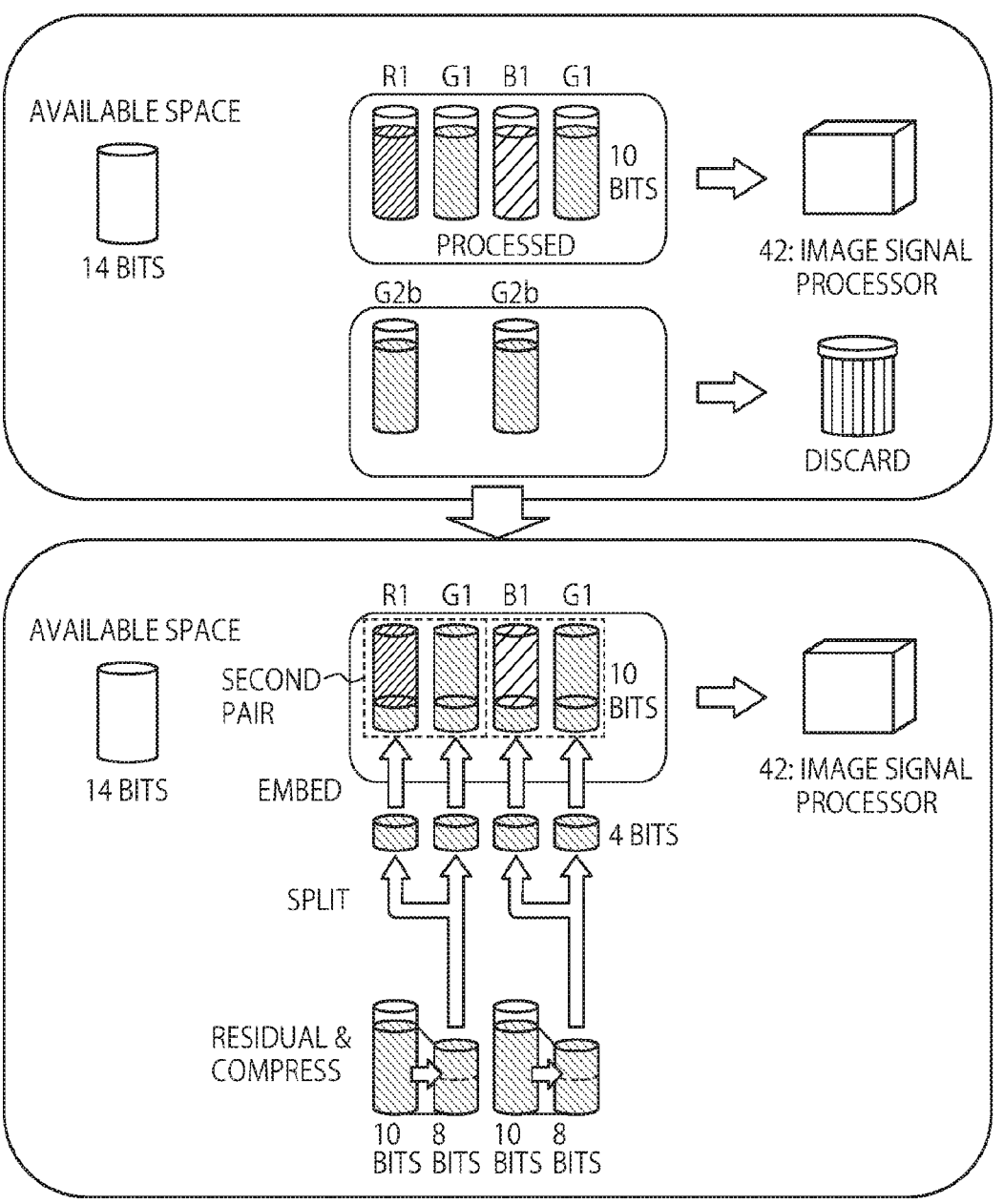
FIG. 9 is a schematic drawing to explain how to split the original residual data to generate a split data and embed the split data into the sparse image data in the embodiment of the present disclosure.

FIG. 9 illustrates a schematic drawing explaining how to generate the split data from the compressed data. An upper part of FIG. 9 shows a comparative example of the related technology and a lower part of FIG. 9 shows an explanation of the present embodiment.

As shown in FIG. 9, the value of the compressed data is expressed by 8 bits, and it is split into the first data part of 4 bits and the second data part of 4 bits.

In the present embodiment, though an available space in the image signal processor 42 is composed of 14 bits for each of the pixels of the sparse image data, each of the pixels of the sparse image data needs 10 bits. Therefore, 4 bits of the 14 bits are reserved bits and not used in the image signal processor 42. That is, a space of 4 bits of the 14 bits is a spare space in which the sparse image data is not stored.

Therefore, in the present embodiment, in order to be able to insert the compressed data composed of 8 bits into the 4 reserved bits of the sparse image data, the compressed data of 8 bits is divided into two 4 bits parts, as the split data. As a result, a size of the first data part and a size of the second data part are matched with a size of the spare space of the sparse image data. Therefore, in the present embodiment, the compressed data of 8 bits is divided into the first data part of 4 bits and the second data part of 4 bits.

Next, as shown in FIG. 4, for example, the main processor 40 embeds the split data into the sparse image data to generate the embedded sparse image data (Step S18). As shown in FIG. 9 and FIG. 6, the split data is embedded into the two 4 reserved bits of the sparse image data.

More specifically, in the present embodiment, each of the red pixels R1, each of the blue pixels B1 and each of the green pixels G1 of the sparse image data has 4 reserved bits which are the spare space for the image signal processor 42. Hereinafter, the sparse image data into which the split data has been embedded is also referred to as the embedded sparse image data.

As shown in FIG. 6, in the sparse image data of the Bayer format, the red pixel R1 and the green pixel G1 can constitute a second pair and the blue pixel B1 and the green pixel G1 can also constitute the second pair. In the Bayer format, each pair of two adjacent pixels includes the green pixel G1 as well as the red pixel R1 or the blue pixel B1. In the example of the sparse image data in FIG. 6, the sparse image data includes 12 (3×4) second pairs, each of which is composed of the green pixel G1 and the red pixel R1 or of the green pixel G1 and the blue pixel B1.

The green pixel G1 in the second pair corresponds to the green pixel G2 in the first pair which is located at a position corresponding to the first pair of the dense image data. That is, when the position of the second pair of the sparse image data is identical to the position of the first pair of the dense image data, a value of the green pixel G1 in the second pair of the sparse image data is substantially the same as a value of the green pixel G2 in the first pair of the dense image data.

In the present embodiment, the first data part of the split data is embedded into the spare space of 4 bits in the green pixel G1 of the second pair, and the second data part of the split data is embedded into the spare space of 4 bits in the red pixel R1 or the blue pixel B1 in the second pair.

That is, the first data part and the second data part of the split data are embedded into the two adjacent red and green pixels R1 and G1 of the second pair or the two adjacent blue and green pixels B1 and G1 of the second pair. Therefore, in the present embodiment, all of the first data parts and the second data parts of the split data can be embedded into the spare spaces of the sparse image data.

Moreover, in the present embodiment, the first pairs of the dense image data and the second pairs of the sparse image data have a one-to-one correspondence. Therefore, the first data part and the second data part are embedded into the two adjacent pixels of the second pair which corresponds to the first pair from which the first data part and second data part were originally calculated. That is, the first data part and the second data part are inserted into the second pair corresponding to the position of the original first pair.

However, the split data may be embedded into the spare space of the sparse image data in any manner which allows specifying where the first data parts and the second data parts of the split data are embedded in the sparse image data.

In the comparative example shown in the upper part of FIG. 9, the information of the green pixels G2b is discarded when the sparse image data is inputted to the image signal processor 42. However, in the present embodiment, the data of the green pixel G2b can also be embedded into the sparse image data and thus information of the green pixels G2b is not discarded.

Next, as shown in FIG. 4, for example, the main processor 40 judges whether all first pairs in the dense image data have been processed and completed (Step S20). That is, in the present embodiment, every original residual data based on the first pair should be embedded into the sparse image data.

If not all first pairs in the dense image data have been processed and completed (Step S20: No), the target image generation process returns to the Step 12 and repeats the processes from the Step S12 to the Step S18. That is, the processes from the Step S12 to the Step S18 are repeated until the original residual data of all first pairs are embedded into the sparse image data.

On the other hand, if all first pairs in the dense image data have been processed and completed (Step S20: Yes), for example, the main processor 40 inputs the embedded sparse image data to the image signal processor 42 (Step S22). That is, the embedded sparse image data including the sparse image data and the split data is inputted to the image signal processor 42 to generate a target image data. Thereafter, the image signal processor 42 initiates processing the sparse image data in the embedded sparse image data to generate the target image data.

Next, as shown in FIG. 5, for example, the main processor 40 obtains the embedded sparse image data from the image signal processor 42 (Step S30). That is, the image signal processor 42 has one or more data output ports to output various kinds of data during processing and one or more data input ports to input various kinds of data to the image signal processor 42. Therefore, the main processor 40 obtains the embedded sparse image data via one of the data output ports of the image signal processor 42.

Figure 10:
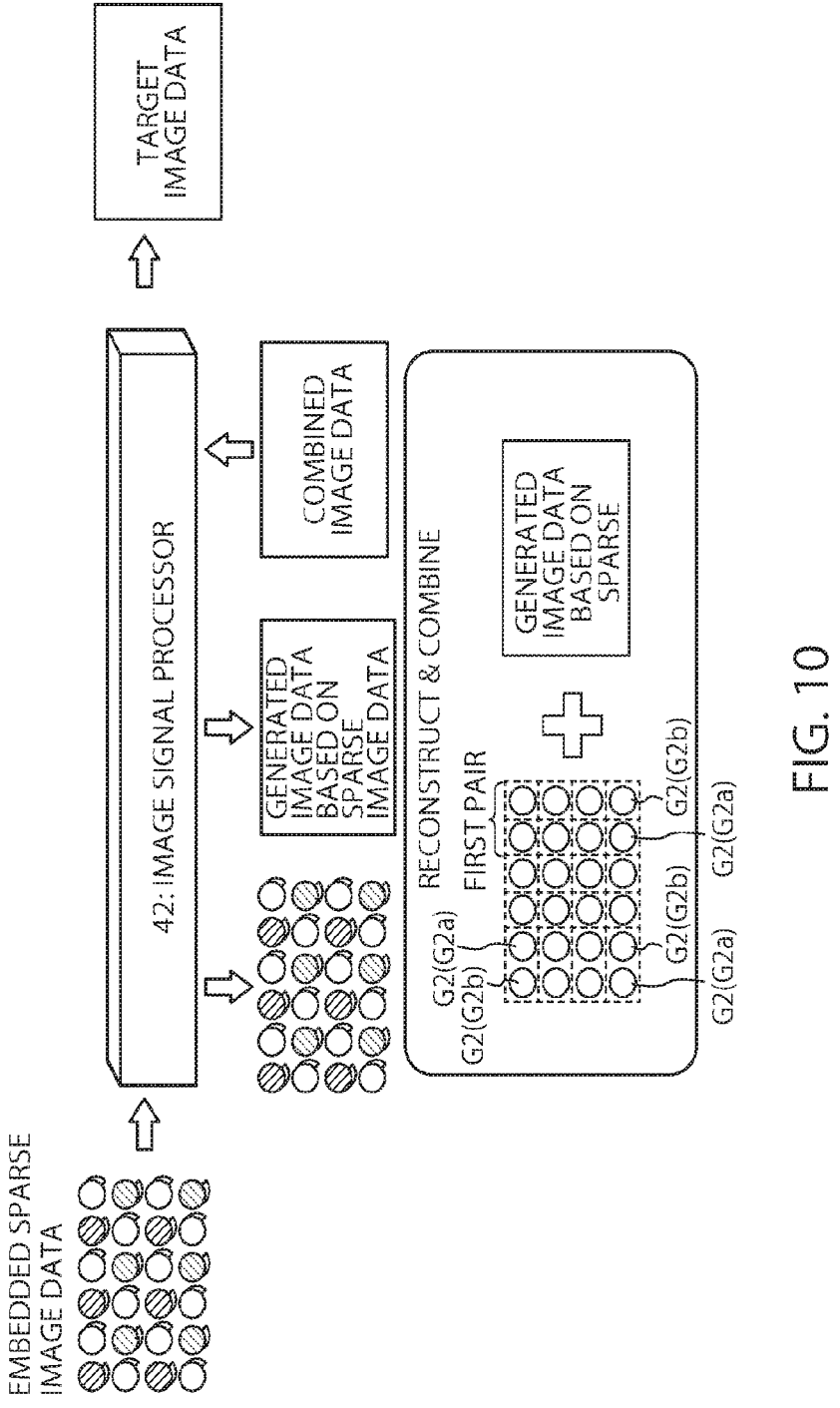
FIG. 10 is a schematic drawing to explain how to generate a combined image data based on a reconstructed dense image data and a generated image data in the embodiment of the present disclosure.

FIG. 10 illustrates a schematic drawing explaining a mechanism to generate the target image data in the present embodiment. As shown in FIG. 10, the embedded sparse image data can be obtained from the image signal processor 42 and the embedded sparse image data includes the sparse image data and the split data.

Incidentally, when the embedded sparse image data is during processing, the embedded sparse image data obtained from the image signal processor 42 may not be the same as the embedded sparse image data inputted to the image signal processor 42. However, since the split data is stored in the spare space in the sparse image data and not destroyed, it is acceptable for the target image generation process disclosed herein.

Next, as shown in FIG. 5, for example, the main processor 40 extracts the split data from the embedded sparse image data (Step S32). That is, the main processor 40 extracts one split data in the second pair in the sparse image data. In the present embodiment, each of the pixels of the sparse image data includes the first data part of 4 bits of the split data or the second data part of 4 bits of the split data. Therefore, the split data including the first data part and the second data part is extracted from the embedded sparse image data. In the present embodiment, for example, the main processor 40 extracts the split data from one second pair in the sparse image data in the Step S32, and the Step S32 through the Step S40 mentioned hereinafter are repeated until all of the split data in the second pairs have been processed.

Next, as shown in FIG. 5, for example, the main processor 40 joins together the first data part and the second data part of the split data to obtain the compressed data (Step S34). As mentioned above, when generating the split data, the compressed data of 8 bits have been split into the first data part of 4 bits and the second data part of 4 bits. Therefore, the compressed data can be reconstructed by joining the first data part and the second data part which have been extracted from the same second pair. By joining the first data part and the second data part in the same second pair, the compressed data shown in FIG. 9 can be obtained again.

Next, as shown in FIG. 5, for example, the main processor 40 inversely converts the compressed data to obtain an inversely converted residual data (Step S36). As mentioned above, the original residual data of 11 bits have been compressed to the compressed data of 8 bits based on the compression curve in the Step S14. Therefore, the inversely converted residual data composed of 11 bits can be obtained from the compressed data composed of 8 bits.

Figure 11:
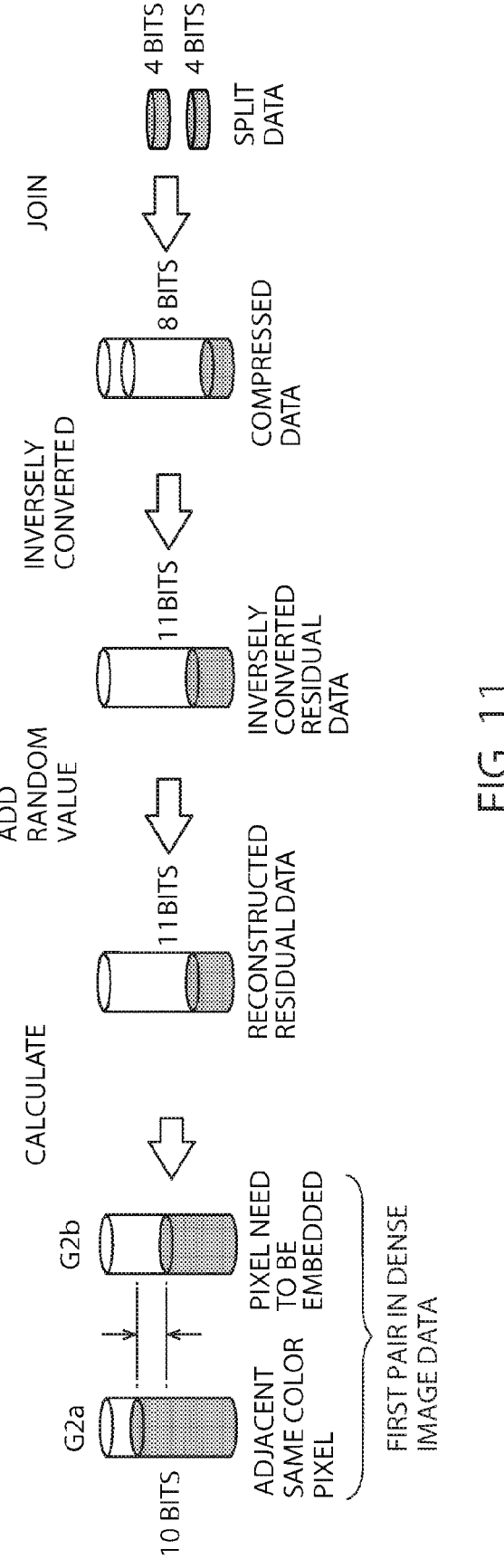
FIG. 11 is a schematic drawing to explain how to reconstruct the two adjacent pixels in the first pair in the dense image data based on the compressed data.

FIG. 11 illustrates a schematic drawing explaining how to reconstruct the dense image data from the split data. That is, FIG. 11 shows a procedure which is the opposite to the generating of the original residual data and the compressed data explained with reference to FIG. 7.

As shown in FIG. 11, the compressed data can be inversely converted by using the compression curve shown in FIG. 8 to obtain the inversely converted residual data. That is, when generating the compression data, the compression data has been converted from the original residual data by using the compression curve shown in FIG. 8. Therefore, by inversely converting the compression data, the inversely converted residual data is the same as, or close to, the original residual data.

Next, as shown in FIG. 5, for example, the main processor 40 adds a random value within an error range to the inversely converted residual data to obtain a reconstructed residual data (Step S38). Since the inversely converted residual data contains some amount of errors with respect to the original residual data, the main processor adds the random value within the error range to the inversely converted residual data in order to conceal the errors with respect to the original residual data.

Figure 12:
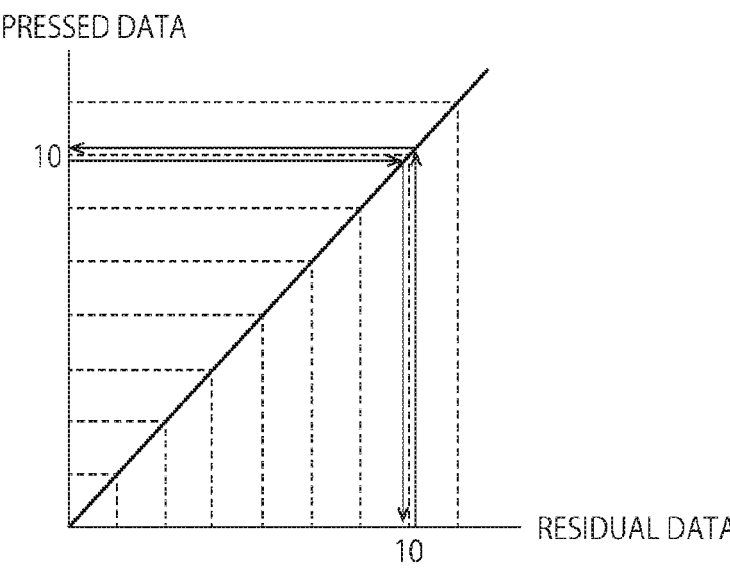
FIG. 12 illustrates the partially enlarged compression curve in which the difference value between the two adjacent pixels in the first pair is relatively small.
Figure 13:
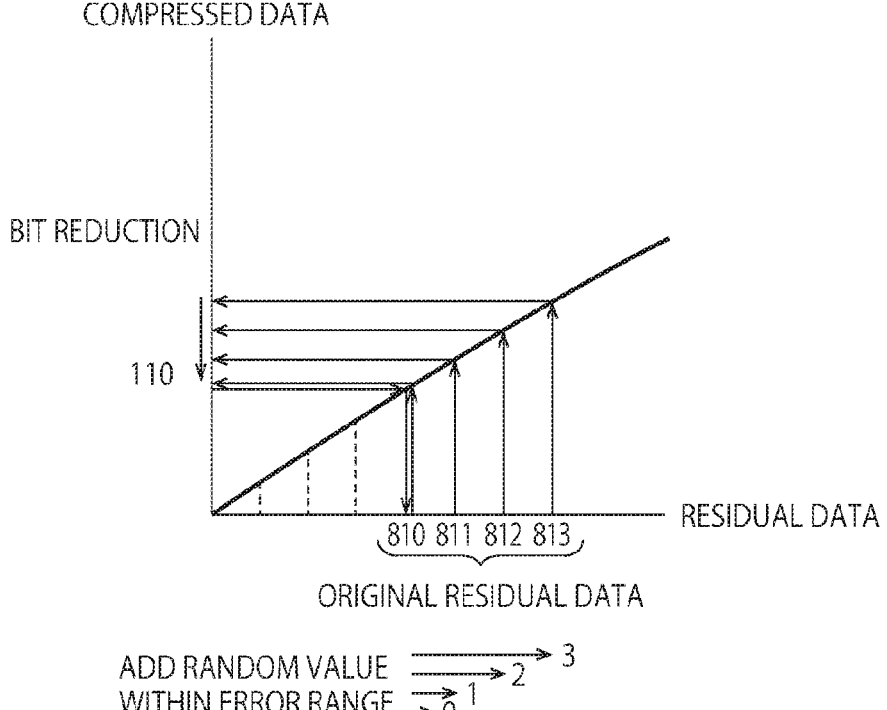
FIG. 13 illustrates the partially enlarged compression curve in which difference value between the two adjacent pixels in the first pair is relatively large.

FIG. 12 illustrates the partially enlarged compression curve in which the difference value between the green pixels G2a and G2b in the first pair is relatively small, and FIG. 13 illustrates the partially enlarged compression curve in which the difference value between the green pixels G2a and G2b in the first pair is relatively large.

As shown in FIG. 12, if the value of the compressed data is 10, the value of the inversely converted residual data is also 10. That is, the inversely converted residual data can be precisely obtained, and the inversely converted residual data is equal to the original residual data.

On the other hand, as shown in FIG. 13, if the compressed data is 110, the value of the inversely converted residual data is 810. However, the original residual data might be 810, 811, 812 or 813. In other words, when compressing the original residual data, the compressed data becomes 110 if the original residual data is 810, 811, 812 and 813. Therefore, it is impossible to obtain the exact same original residual data by inversely converting the compressed data. It results in jaggies and lines in the target image data.

Therefore, in the present embodiment, for example, the main processor 40 adds the random value within the error range to the inversely converted residual data. In the example in FIG. 13, the main processor 40 adds 0, 1, 2 or 3 to 810. In this case, the values of 0, 1, 2 and 3 are random values within the error range and 810 is the inversely converted residual data. That is, the random value within the error range is one of values which are value difference values between that which the original residual data can take in the compression curve and that of the inversely converted residual data.

In accordance with the compression curve in FIG. 8, the random value of the error range depends on the value of the residual data. If the residual data is small, the error range is narrow. For example, if the compressed data is 10, the random value of the error range can only be 0 because the inversely converted residual data can only be 10.

On the other hand, if the residual data is large, the error range is wide. For example, if the compressed data is 110, the random value of the error range is 0, 1, 2, or 3 because the inversely converted residual data is 810 but the original residual data might be 810, 811, 812 or 813.

In the present embodiment, if the compression data is larger than 110, the error range is wider than 4.

The original residual data is unknown, and thus, in the present embodiment, the random value within the error range is added to the inversely converted residual data to obtain the reconstructed residual data. In other words, the reconstructed residual data can be dispersed at random within possible original residual data.

Next, as shown in FIG. 5, for example, the main processor 40 reconstructs the dense image data based on the reconstructed residual data (Step S40). That is, as shown in FIG. 11, in order to calculate the value of the green pixel G2*b*, the reconstructed residual data is added to the value of the green pixel G2*a*.

As explained above, the dense image data includes the plurality of the first pairs, each of which includes the green pixel G2*a* and the green pixel G2*b*. In addition, the value of the residual data indicates the value difference value between the value of the green pixel G2*a* and the value of the green pixel G2*b* in the first pair. The value of the green pixel G2*a* can be obtained from the embedded sparse image data from the image signal processor 42, because the value of the green pixel G2*a* is substantially the same as the value of the green pixel G1 in the sparse image data. As a result, the value of the green pixel G2*b* can be calculated by adding the value of the residual data to the value of the green pixel G2*a*.

Thereafter, the first pair of the dense image data can be obtained by merging the value of the green pixels G1 of the sparse image data and the value of the green pixels G2*b* calculated by adding the value of the residual data to the value of the green pixel G2*a*.

Next, as shown in FIG. 5, for example, the main processor 40 judges whether all split data in the embedded sparse image data have been processed and completed (Step S42). That is, in the present embodiment, every split data should be extracted from the embedded sparse image data and processed to reconstruct the green pixels G2*b* in all of the first pairs of the dense image data.

If not all split data in the embedded sparse image data have been processed and completed (Step S42: No), the target image generation process returns to the Step 32 and repeats the processes from the Step S32 to the Step S40. That is, the processes from the Step S32 to the Step S40 are repeated until the green pixels G2*b* in all of the first pairs of the dense image data are reconstructed.

On the other hand, if all split data in the embedded sparse image data have been processed and completed (Step S42: Yes), it means that the dense image data composed of the first pairs including the green pixel G2*a* and the green pixel G2*b* has been reconstructed. Therefore, for example, the main processor 40 obtains a generated image data based on the sparse image data from one of the data output ports of the image signal processor 42 (Step S44). In the Step S44, the generated image data is obtained by all data generated in Step S32 to Step S42. As shown in FIG. 10, the image data generated as a result of processing starting with the sparse image data can be obtained from the image signal processor 42.

Next, as shown in FIG. 5, for example, the main processor 40 combines the reconstructed dense image data and the generated image data obtained in the Step 44 to generate a combined image data (Step S46).

Figure 14:
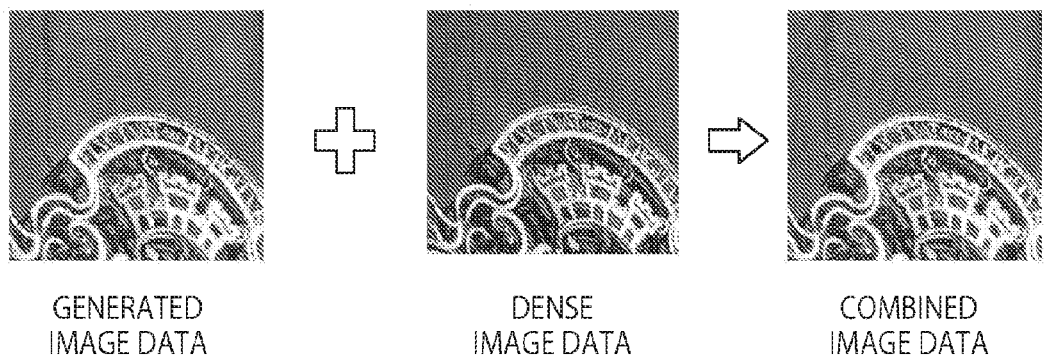
FIG. 14 is a schematic drawing of a mechanism for generating the target image data based on the embedded sparse image data in the embodiment of the present disclosure.

FIG. 14 illustrates one example of combining the generated image data based on the sparse image data and the dense image data reconstructed in Step S46. As shown in FIG. 14, the generated image data has been generated on the basis of the sparse image data in the image signal processor 42. As a result, even if an image of the generated image data is displayed on the display 20, the brightness of the image might be slightly rough but it is a full colored image. On the contrary, if an image of the dense image data is displayed on the display 20, the brightness of the image can be satisfactory because the color of the dense image data is green, which is a light-sensitive color for the human eye. Therefore, in the present embodiment, the dense image data is combined with the generated image data based on the sparse image data to generate the combined image data.

Next, as shown in FIG. 5 and FIG. 10, for example, the main processor 40 inputs the combined image data to one of the data input ports of the image signal processor 42 (Step S48). Thereafter, the image signal processor 42 continues processing the combined image data, and the target image data is eventually outputted from the image signal processor 42.

For example, an image to be displayed on the display 20 may be generated based on the target image data. Alternatively, the target image data may be stored in the memory 44. There are a variety of formats for the target image data. For instance, the target image data may be formatted as JPEG, TIFF, GIF or the like.

As described above, in accordance with the electrical device 10 according to the present embodiment, the reconstructed residual data is obtained by adding the random value within the error range to the inversely converted residual data. Therefore, the reconstructed residual data can be dispersed at random within possible original residual data. As a result, it is possible to conceal the jaggies in the target image data.

Incidentally, in the embodiment mentioned above, although the compressed data is split into the first data part and the second data part, it is not necessarily to split the compressed data if the spare space in the sparse image data is enough to accommodate the non-split compressed data. In this case, the compressed data can be directly embedded into the sparse image data and thus the compressed data can be directly extracted from the embedded sparse image data obtained from the image signal processor 42.

Furthermore, in the embodiment mentioned above, although the dense image data is generated in green, another color may be used to generate the dense image data. For example, yellow may be used to generate the dense image data. In this case, the color filter of the image sensor of the camera assembly 30 is composed of red, yellow and blue (RYB), and the sparse image data is composed of red, yellow and blue whereas the dense image data is composed of yellow.

Moreover, the sparse image data may include more than three colors. For example, the sparse image data may include green pixels, red pixels, blue pixels and yellow pixels. That is, the sparse image data may include a plurality of pixels of at least three colors.

In one aspect, a method of generating a target image data, includes: obtaining an embedded sparse image data for generating the target image data from an image signal processor, wherein the embedded sparse image data includes a sparse image data, and the sparse image data includes a plurality of pixels which include at least pixels in a first color, pixels in a second color and pixels in a third color; extracting a split data including a first data part and a second data part from the sparse image data; joining the first data part and the second data part to obtain a compressed data; inversely converting the compressed data based on a compression curve to obtain an inversely converted residual data; adding a random value within an error range to the inversely converted residual data to obtain a reconstructed residual data; and reconstructing a dense image data based on the reconstructed residual data and the sparse image data, wherein the dense image data includes a plurality of pixels including the pixels in the first color.

In some embodiments, the random value within the error range is one of difference values between a value of an original residual data taken in the compression curve and a value of the inversely converted residual data.

In some embodiments, two adjacent pixels in the dense image data constitute a first pair, and the first pair includes a first value of a first pixel in the first color and a second value of a second pixel in the first color.

In some embodiments, the reconstructing the dense image data includes: obtaining the first value of the first pixel in the first color in the first pair from the sparse image data; adding the reconstructed residual data to the first value of the first pixel in the first color to obtain the second value of the second pixel in the first color.

In some embodiments, the second pixel in the first pair is absent in the sparse image data.

In some embodiments, the method further includes: obtaining, based on the sparse image data from the image signal processor, a generated image data during processing to generate the target image data; and combining the generated image data and the dense image data reconstructed from the reconstructed residual data to generate a combined image data.

In some embodiments, the method further includes inputting the combined image data to the image signal processor.

In some embodiments, the compression curve is substantially S-shaped in which a compression ratio for larger residual data is larger than a compression ratio for smaller residual data.

In some embodiments, the method further includes: obtaining the sparse image data and the dense image data from a camera assembly configured to capture an object; generating the original residual data based on the dense image data by calculating a difference value between the first value of the first pixel in the first color and the second value of the second pixel in the first color in the first pair in the dense image data; generating the compressed data by compressing an original residual data to reduce its data amount based on the compression curve; generating the split data by splitting the compressed data into the first data part and the second data part; and embedding the split data into the sparse image data to generate the embedded sparse image data.

In some embodiments, the two adjacent pixels in the sparse image data constitute a second pair, and the first data part and the second data part are embedded into the two adjacent pixels in the second pair which is located at a position corresponding to the first pair of the dense image data.

In some embodiments, the second pair comprises a pixel in the first color and a pixel in the second color, or comprises the pixel in the first color and a pixel in the third color; and the pixel in the first color in the second pair corresponds to the first pixel in the first color in the first pair.

In some embodiments, the method further includes inputting the embedded sparse image data to the image signal processor.

In some embodiments, the first color is green, the second color is red, and the third color is blue.

In some embodiments, the sparse image data is in conformity to a Bayer format.

In one aspect, an electrical device, includes: an image signal processor configured to generate a target image data based on an embedded sparse image data; and a main processor configured to: obtain the embedded sparse image data for generating the target image data from the image signal processor, wherein the embedded sparse image data includes a sparse image data, and the sparse image data includes a plurality of pixels which include at least pixels in a first color, pixels in a second color and pixels in a third color; extract a split data including a first data part and a second data part from the sparse image data; join the first data part and the second data part to obtain a compressed data; inversely convert the compressed data based on a compression curve to obtain an inversely converted residual data; add a random value within an error range to the inversely converted residual data to obtain a reconstructed residual data; and reconstruct a dense image data based on the reconstructed residual data and the sparse image data, wherein the dense image data includes a plurality of pixels including the pixels in the first color.

In some embodiments, the random value within the error range is one of difference values between a value of an original residual data taken in the compression curve and a value of the inversely converted residual data.

In some embodiments, two adjacent pixels in the dense image data constitute a first pair, and the first pair includes a first value of a first pixel in the first color and a second value of a second pixel in the first color.

In some embodiments, an electrical device further includes: obtaining the sparse image data and the dense image data from a camera assembly configured to capture an object; generating the original residual data based on the dense image data by calculating a difference value between the first value of the first pixel in the first color and the second value of the second pixel in the first color in the first pair in the dense image data; generating the compressed data by compressing an original residual data to reduce its data amount based on the compression curve; generating the split data by splitting the compressed data into the first data part and the second data part; and embedding the split data into the sparse image data to generate the embedded sparse image data.

In one aspect, a non-transitory computer readable medium comprising program instructions stored thereon for performing at least the following: obtaining an embedded sparse image data for generating the target image data from an image signal processor, wherein the embedded sparse image data includes a sparse image data, and the sparse image data includes a plurality of pixels which include at least first color pixels, second color pixels and third color pixels; extracting a split data including a first data part and a second data part from the sparse image data; joining the first data part and the second data part to obtain a compressed data; inversely converting the compressed data based on a compression curve to obtain an inversely converted residual data; adding a random value within an error range to the inversely converted residual data to obtain a reconstructed residual data; and reconstructing a dense image data based on the reconstructed residual data and the sparse image data, wherein the dense image data includes a plurality of pixels including the first color pixels.

In some embodiments, the random value within the error range is one of difference values between a value of an original residual data taken in the compression curve and a value of the inversely converted residual data.

In the description of embodiments of the present disclosure, it is to be understood that terms such as "central", "longitudinal", "transverse", "length", "width", "thickness", "upper", "lower", "front", "rear", "back", "left", "right", "vertical", "horizontal", "top", "bottom", "inner", "outer", "clockwise" and "counterclockwise" should be construed to refer to the orientation or the position as described or as shown in the drawings under discussion. These relative terms are only used to simplify description of the present disclosure, and do not indicate or imply that the device or element referred to must have a particular orientation, or constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the description of embodiments of the present disclosure, unless specified or limited otherwise, the terms "mounted", "connected", "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the embodiments of the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the above description to implement different structures of the present disclosure. In order to simplify the present disclosure, certain elements and settings are described in the above. However, these elements and settings are only by way of example and are not intended to limit the present disclosure. In addition, reference numbers and/or reference letters may be repeated in different examples in the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment", "some embodiments", "an exemplary embodiment", "an example", "a specific example" or "some examples" means that a particular feature, structure, material, or characteristics described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which it should be understood by those skilled in the art that functions may be implemented in a sequence other than the sequences shown or discussed, including in a substantially identical sequence or in an opposite sequence.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although embodiments of the present disclosure have been shown and described, it would be appreciated by those skilled in the art that the embodiments are explanatory and cannot be construed to limit the present disclosure, and changes, modifications, alternatives and variations can be made in the embodiments without departing from the scope of the present disclosure.

The invention claimed is:

1. A method of generating a target image data, comprising:

obtaining an embedded sparse image data for generating the target image data from an image signal processor, wherein the embedded sparse image data includes a sparse image data and a split data embedded into the sparse image data, and the sparse image data includes a plurality of pixels which include at least pixels in a first color, pixels in a second color and pixels in a third color;

extracting the split data including a first data part and a second data part from the embedded sparse image data, wherein the first data part and the second data part are obtained by splitting compressed data corresponding to a dense image data;

joining the first data part and the second data part to obtain the compressed data;

inversely converting the compressed data based on a compression curve to obtain an inversely converted residual data;

adding a random value within an error range to the inversely converted residual data to obtain a reconstructed residual data; and reconstructing the dense image data based on the reconstructed residual data and the sparse image data, wherein the dense image data includes a plurality of pixels including the pixels in the first color;

wherein the sparse image data and the dense image data are respectively captured by a camera assembly for one object.

2. The method according to claim 1, wherein the random value is one of difference values between a value of an original residual data taken in the compression curve and a value of the inversely converted residual data.

3. The method according to claim 2, wherein two adjacent pixels in the dense image data constitute a first pair, and the first pair includes a first value of a first pixel in the first color and a second value of a second pixel in the first color.

4. The method according to claim 3, the reconstructing the dense image data comprising:

obtaining the first value of the first pixel in the first color in the first pair from the sparse image data; and adding the reconstructed residual data to the first value of the first pixel in the first color to obtain the second value of the second pixel in the first color.

5. The method according to claim 3, further comprising:

obtaining the sparse image data and the dense image data from the camera assembly configured to capture an object;

generating the original residual data based on the dense image data by calculating a difference value between the first value of the first pixel in the first color and the second value of the second pixel in the first color in the first pair in the dense image data;

generating the compressed data by compressing an original residual data to reduce its data amount based on the compression curve;

generating the split data by splitting the compressed data into the first data part and the second data part; and embedding the split data into the sparse image data to generate the embedded sparse image data;

wherein each pixel of the sparse image data is stored in a corresponding one of available spaces in the image signal processor, a spare space in which the sparse image data is not stored is reserved in each of the available spaces; and the first data part is embedded into the spare space of a corresponding one of the available spaces, and the second data part is embedded into the spare space of another corresponding one of the available spaces.

6. The method according to claim 5, wherein the two adjacent pixels in the sparse image data constitute a second pair, and the first data part and the second data part are embedded into the two adjacent pixels in the second pair which is located at a position corresponding to the first pair of the dense image data.

7. The method according to claim 6, wherein the second pair comprises a pixel in the first color and a pixel in the second color, or comprises the pixel in the first color and a pixel in the third color; and the pixel in the first color in the second pair corresponds to the first pixel in the first color in the first pair.

8. The method according to claim 5, further comprising inputting the embedded sparse image data to the image signal processor.

9. The method according to claim 3, wherein the second pixel in the first pair is absent in the sparse image data.

10. The method according to claim 1, further comprising:

obtaining, based on the sparse image data from the image signal processor, a generated image data during processing to generate the target image data; and combining the generated image data and the dense image data reconstructed from the reconstructed residual data to generate a combined image data.

11. The method according to claim 10, further comprising inputting the combined image data to the image signal processor.

12. The method according to claim 1, wherein the compression curve is substantially S-shaped in which a compression ratio for larger residual data is larger than a compression ratio for smaller residual data.

13. The method according to claim 1, wherein the first color is green, the second color is red, and the third color is blue.

14. The method according to claim 13, wherein the sparse image data is in conformity to a Bayer format.

15. An electrical device, comprising:

an image signal processor configured to generate a target image data based on an embedded sparse image data; and a main processor configured to:

obtain the embedded sparse image data for generating the target image data from the image signal processor, wherein the embedded sparse image data includes a sparse image data and a split data embedded into the sparse image data, and the sparse image data includes a plurality of pixels which include at least pixels in a first color, pixels in a second color and pixels in a third color;

extract the split data including a first data part and a second data part from the embedded sparse image data, wherein the first data part and the second data part are obtained by splitting compressed data corresponding to a dense image data;

join the first data part and the second data part to obtain the compressed data;

inversely convert the compressed data based on a compression curve to obtain an inversely converted residual data;

add a random value within an error range to the inversely converted residual data to obtain a reconstructed residual data; and reconstruct the dense image data based on the reconstructed residual data and the sparse image data, wherein the dense image data includes a plurality of pixels including the pixels in the first color;

wherein the sparse image data and the dense image data are respectively captured by a camera assembly for one object.

16. The electrical device according to claim 15, wherein the random value within the error range is one of difference values between a value of an original residual data taken in the compression curve and a value of the inversely converted residual data.

17. The electrical device according to claim 16, wherein two adjacent pixels in the dense image data constitute a first pair, and the first pair includes a first value of a first pixel in the first color and a second value of a second pixel in the first color.

18. The electrical device according to claim 17, further comprising:

obtaining the sparse image data and the dense image data from the camera assembly configured to capture an object;

generating the original residual data based on the dense image data by calculating a difference value between the first value of the first pixel in the first color and the second value of the second pixel in the first color in the first pair in the dense image data;

generating the compressed data by compressing an original residual data to reduce its data amount based on the compression curve;

generating the split data by splitting the compressed data into the first data part and the second data part; and embedding the split data into the sparse image data to generate the embedded sparse image data;

wherein each pixel of the sparse image data is stored in a corresponding one of available spaces in the image signal processor, a spare space in which the sparse image data is not stored is reserved in each of the available spaces; and the first data part is embedded into the spare space of a corresponding one of the available spaces, and the second data part is embedded into the spare space of another corresponding one of the available spaces.

19. A non-transitory computer readable medium comprising program instructions stored thereon for performing at least:

obtaining an embedded sparse image data for generating target image data from an image signal processor, wherein the embedded sparse image data includes a sparse image data and a split data embedded into the sparse image data, and the sparse image data includes a plurality of pixels which include at least first color pixels, second color pixels and third color pixels;

extracting the split data including a first data part and a second data part from the embedded sparse image data, wherein the first data part and the second data part are obtained by splitting compressed data corresponding to a dense image data;

joining the first data part and the second data part to obtain the compressed data;

inversely converting the compressed data based on a compression curve to obtain an inversely converted residual data;

adding a random value within an error range to the inversely converted residual data to obtain a reconstructed residual data; and reconstructing the dense image data based on the reconstructed residual data and the sparse image data, wherein the dense image data includes a plurality of pixels including the first color pixels;

wherein the sparse image data and the dense image data are respectively captured by a camera assembly for one object.

20. The non-transitory computer readable medium according to claim 19, wherein the random value within the error range is one of difference values between a value of an original residual data taken in the compression curve and a value of the inversely converted residual data.

* * * * *